US006594279B1

United States Patent
Nguyen et al.

(10) Patent No.: US 6,594,279 B1
(45) Date of Patent: Jul. 15, 2003

(54) METHOD AND APPARATUS FOR TRANSPORTING IP DATAGRAMS OVER SYNCHRONOUS OPTICAL NETWORKS AT GUARANTEED QUALITY OF SERVICE

(75) Inventors: Thinh Duc Nguyen, Kanata (CA); Israel Elchonin Sand, Woodlawn (CA)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/296,578

(22) Filed: Apr. 22, 1999

(51) Int. Cl.[7] .................................................. H04J 3/16
(52) U.S. Cl. ........................................ 370/468; 370/229
(58) Field of Search ................................ 370/258, 252, 370/253, 465, 466, 468, 469, 471, 395, 395.21, 229–235, 461, 462, 503, 508, 402, 403–406, 222, 223, 224, 225, 226; 359/118, 119, 135, 136, 120, 121, 145, 146

(56) References Cited

U.S. PATENT DOCUMENTS

| | | | | |
|---|---|---|---|---|
| 5,412,652 A | * | 5/1995 | Lu | 370/223 |
| 5,479,404 A | | 12/1995 | Francois et al. | 370/84 |
| 5,479,608 A | * | 12/1995 | Richardson | 340/825.01 |
| 5,675,732 A | * | 10/1997 | Majeti et al. | 348/384.1 |
| 6,075,788 A | * | 6/2000 | Vogel | 370/395.51 |
| 6,084,892 A | * | 7/2000 | Benash et al. | 370/401 |
| 6,259,699 B1 | * | 7/2001 | Opalka et al. | 370/389 |
| 6,320,846 B1 | * | 11/2001 | Jamp et al. | 370/235 |
| 6,356,544 B1 | * | 3/2002 | O'Connor | 370/353 |

OTHER PUBLICATIONS

Miller, LAN Technologies Explained, Chapter 16 and 19, Digital Press 2000 ISBN 15558234.*

* cited by examiner

Primary Examiner—Dang Ton
(74) Attorney, Agent, or Firm—Max R. Wood; Ogilvy Renault

(57) ABSTRACT

A method and apparatus for transporting IP datagrams over SONET at a guaranteed quality of service are described. The method utilizes a multi-level bandwidth management hierarchy. A bandwidth allocation manager provides real time high level control of bandwidth allocation in each SONET domain. A bandwidth client at each node in the domain negotiates bandwidth requirements for IP services connected to the node. This enables low error bit rate, scalability and reliable service that can provide guaranteed quality of service for IP applications. All aspects of connection setup, bandwidth allocation, bandwidth size adjustment and connection termination are negotiated by the bandwidth client with the bandwidth allocation manager. Multiple domains can be interconnected to form larger networks providing reliable connections at a guaranteed QOS.

30 Claims, 5 Drawing Sheets

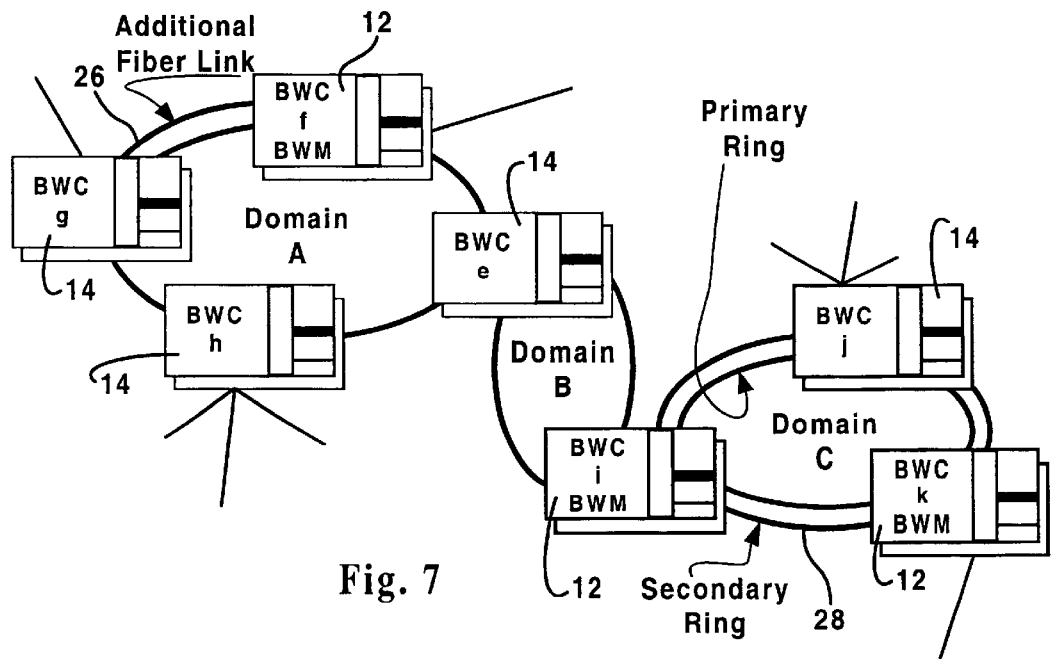
Fig. 7
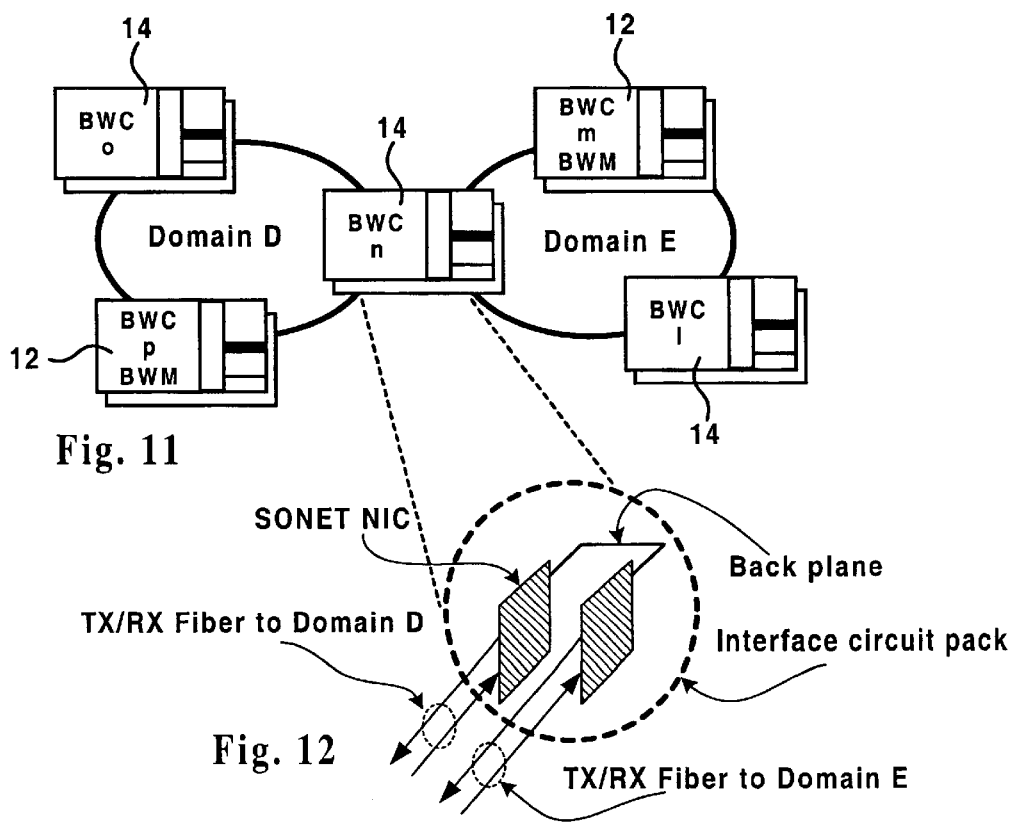
Fig. 11
Fig. 12

METHOD AND APPARATUS FOR TRANSPORTING IP DATAGRAMS OVER SYNCHRONOUS OPTICAL NETWORKS AT GUARANTEED QUALITY OF SERVICE

TECHNICAL FIELD

The invention relates to data transport over a Synchronous Optical Network (SONET) and, in particular, to an apparatus and method for transporting IP datagrams over SONET to link IP-based applications at high data rates with guaranteed quality of service.

BACKGROUND OF THE INVENTION

In recent years, the telecommunications industry has been attempting to develop a network architecture that will support currently provided services as well as future IP-based multimedia applications. Currently, voice services are provided using traditional Time Division Multiplex (TDM) networks, which support real-time communications by means of switched circuits. Data services, such as Internet traffic, rely on a packet switching technology that uses a store-and-forward mechanism. Network providers and data service providers are concerned about having to manage two types of traffic, especially managing two separate networks. A further evidence of concern is that the exponential explosion of Internet traffic has shown that IP routing equipment causes a transfer bottleneck. The ever increasing network complexity is also becoming an important issue.

A trend today is to network services remotely in server farms. Consequently, network providers require new and cost effective technologies for interconnecting server farms with Internet Points of Presence (POPs).

This presents a twofold challenge. First, providing QOS to both required services such as Dynamic Naming System (DNS) as well as new value added services such as multimedia and WEB hosting. Second, providing reliable and cost effective transport from remote server farms to the POPs.

Such industry trends indicate a need for a change from traditional voice-dominant traffic networking to data-dominant traffic networking. Current proliferation of multimedia applications exert a high demand for end-to-end connections of a high Quality-of-Service (QoS). Services such as teleconferencing, video, voice and hi-fi audio are bandwidth consumers and delay intolerant. Therefore a connection of a high QoS, is one which guarantees a transport bandwidth and a deterministic signal propagation delay factor. Bandwidth utilization over the network is also closely related to profitability. Consequently, an efficient solution is required for managing bandwidth utilization.

Asynchronous Transfer Mode (ATM) has been proposed as a solution to all problems for voice and data services. As the implementation of ATM has progressed, however, it is clear that the advances promised for ATM have not been fulfilled. Rather, problems with traffic management, which ATM was supposed to eliminate in the first place, have become more and more apparent. Furthermore, IP over ATM does not appear to be an economical combination of protocols. It is unlikely that ATM will cope with the future IP-based applications that require high QoS.

Packet over SONET (POS) is a new and emerging technology attracting a lot of attention from both the telecommunications and data industries. The idea is to use SONET as a scalable and super-reliable physical transport medium to carry IP traffic, and IP technology to provide all services, including teleconferencing, voice, video, hi-fi audio, e-mail, news, etc. From an initial perspective, POS seems to be a very attractive solution, but the issue regarding QoS still needs to be addressed because POS is currently based on a shared environment.

There therefore exists a need for a way of implementing Packet over SONET that can guarantee the QoS that the current implementations of POS cannot.

OBJECTS OF THE INVENTION

It is an object of the present invention to provide centralized dynamic bandwidth management over a SONET domain that adapts to different types of traffic in real time.

It is a further object of the invention to provide transport of data traffic over a SONET domain characterized by a deterministic end-to-end delay.

It is another object of the invention to guarantee transport bandwidth over a SONET domain to packet based services.

It is another object of the invention to guarantee bandwidth and a deterministic end-to-end delay to IP based services transported through a SONET domain.

It is another object of the invention to provide guaranteed QoS for data traffic over a SONET domain through careful centralized bandwidth management.

It is a another object of the invention to provide guaranteed QoS for data traffic over a SONET domain shared with voice traffic.

It is another object of the invention to provide a programmable transport node bridging connections between an IP network to a SONET domain.

It is another object of the invention to provide a hardware interface for multiplexing IP packets into SONET frames and de-multiplexing IP packets from SONET frames.

It is another object of the invention to provide a scalable solution for IP traffic transport of high QoS over SONET.

It is another object of the invention to provide a reliable transport solution for data transfer between server farms and POPs using SONET which incorporates high QoS bandwidth management.

It is another object of the invention to provide a bandwidth management solution that accommodates high QoS data transport over interconnected SONET domains forming a network.

It is yet another object of the invention to provide a single bandwidth management protocol for data transport at high QoS for IP services across interconnected SONET domains forming a network.

SUMMARY OF THE INVENTION

In accordance with a first aspect of the invention, there is provided a method of transporting Internet Protocol (IP) datagrams received from an IP network through a Synchronous Optical Network (SONET) with a quality of service characterized by a deterministic end-to-end transfer delay in the SONET network, comprising the steps of:

accepting at a node in the SONET network a connection request from an IP service seeking to transfer datagrams through the SONET network;

formulating a management message to request a bandwidth allocation in response to the connection request;

sending the management message to a bandwidth allocation manager for the SONET network; and assigning the connection to a channel for transporting the datagrams if the bandwidth allocation manager grants an allocation of the bandwidth for the connection request.

In accordance with a further aspect of the invention, there is provided apparatus for transporting IP datagrams received from an IP network through a SONET with a quality of service characterized by a deterministic end-to-end transfer delay in the SONET network, comprising:

a plurality of SONET nodes interconnected by at least one optical fiber ring, each of the SONET nodes including a transport protocol interface for receiving the IP datagrams from the IP network, a driver entity for passing the IP datagrams to a High Level Data Link Controller (HDLC) which provides a minimum level of framing for IP datagrams, a Field Programmable Gate Array (FPGA) for generating timing signals for the HDLC and for performing an Add/Drop function to insert datagrams into and extract datagrams from SONET frames; and a one of the SONET nodes being further adapted to serve as a bandwidth manager to track usage of containers for transporting the datagrams within the SONET network.

A bandwidth management protocol and hardware are employed to achieve a multilevel control hierarchy for real time dynamic bandwidth management over SONET to provide Quality of Service characterized by a guaranteed bandwidth and a deterministic end-to-end delay for IP services. The control hierarchy is divided between control of inter- and intra-domain data traffic.

For intra-domain data traffic, bandwidth management is divided between bandwidth clients and a bandwidth allocation manager. A messaging protocol is provided for intra-domain data traffic which provides for real time dynamic bandwidth allocation including: election of a bandwidth allocation manager for a domain, re-election in the case of bandwidth allocation manager malfunction, allocation of bandwidth for connection-less traffic, setting-up new QoS connections, real time dynamic adjustment of the bandwidth for QoS connections, and connection tear down.

For inter-domain data traffic the bandwidth management is divided between bandwidth allocation managers of the domains. A messaging protocol is provided for inter-domain data traffic which provides for real time dynamic bandwidth allocation including: setting-up new QoS connections, real time dynamic adjustment of the bandwidth for QoS connections and connection tear down. Requests for QoS connections made by a bandwidth manager of a remote domain are passed to the bandwidth manager of a local domain through the bandwidth clients which route data between the two domains. The requests made to the local manager by the remote manager are made by the local bandwidth client that routes the traffic from the remote domain on behalf of the remote bandwidth manager.

A hardware interface bridges an IP network to a SONET domain. The hardware interface multiplexes IP packets into SONET frames and demultiplexes IP packets from SONET frames. IP packets are transported under the control of the local bandwidth client associated with the node. QoS connections of guaranteed bandwidth and deterministic end-to-end delay for IP services are thus provided.

Scalability on the SONET domain is implemented through the addition of extra optical links between the nodes in the domain which requires increased data throughput.

BRIEF DESCRIPTION OF THE DRAWINGS

The, invention will now be described by way of example only and with reference to the accompanying drawings, in which:

FIG. 7 is a schematic connection diagram of a SONET network comprising interconnected domains, it also shows two examples of how data throughput can be scaled up according to the invention;

FIG. 11, which appears on sheet 3 of the drawings, illustrates two interconnected SONET domains with a bandwidth client being a node in each domain; and FIG. 12, which also appears on sheet 3 of the drawings, illustrates the SONET interface circuit pack and how data is passed from one domain to the other.

DETAILED DESCRIPTION OF THE PREFERRED EMBODIMENT

In order to transport IP packets over a SONET for exchanging data at a guaranteed bandwidth with a deterministic delay, a mechanism is required, and a network interface component is required for multiplexing IP packets into SONET frames and demultiplexing IP packets from SONET frames.

Figure 1:
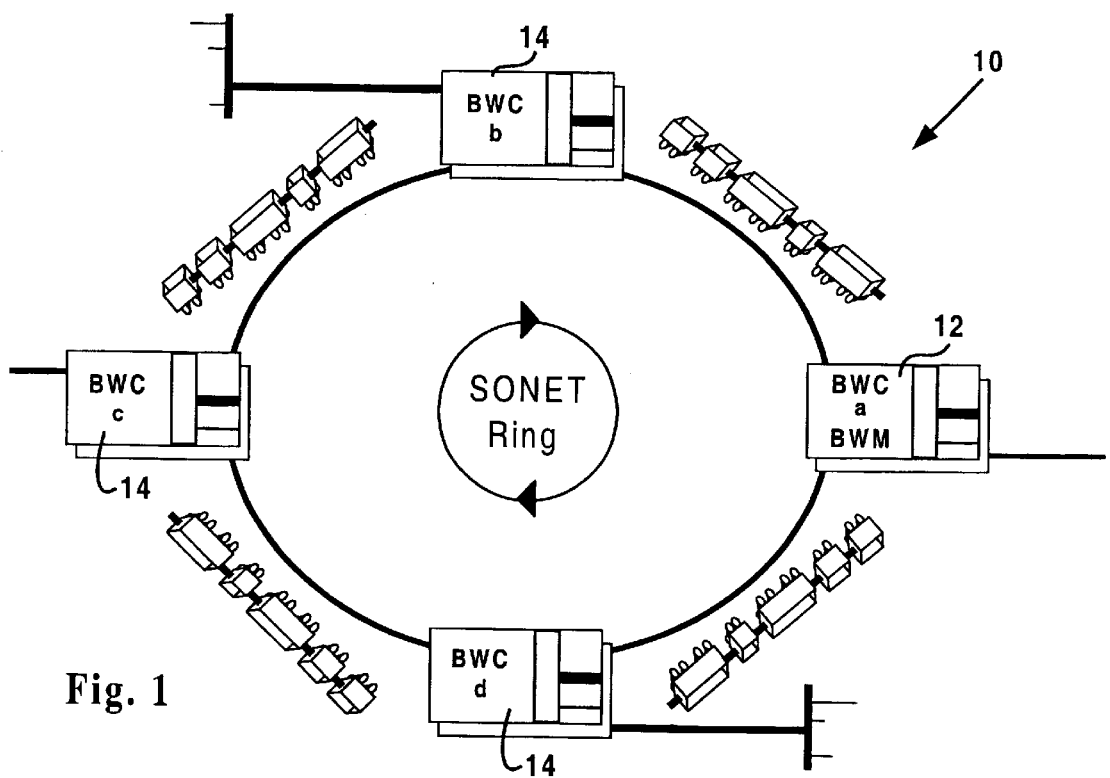
FIG. 1 is a schematic connection diagram having a SONET domain in accordance with the invention, the SONET domain including four nodes.

According to a preferred embodiment of the invention, a mechanism in nodes in a SONET domain for exchanging data at a guaranteed bandwidth with a deterministic delay is accomplished through careful bandwidth management implemented as a multi-level control hierarchy. As seen in FIG. 1, each SONET domain 10 includes a designated bandwidth allocation manager (BWM) 12 and a plurality of bandwidth clients (BWC) 14. The bandwidth allocation manager 12 is also a bandwidth client of the domain. The bandwidth allocation manager and the bandwidth clients 14 are software entities. The bandwidth clients 14 are therefore programmable transport nodes in the SONET domain 10. All IP data traffic is routed through the bandwidth clients 14. The bandwidth clients 14 perform the tasks required to initiate bandwidth allocation/size adjustment/de-allocation based on changes in the data traffic volume.

In a SONET domain 10, every node need not include a bandwidth client. Some nodes may only service traditional voice traffic, while permitting data traffic to pass through at the transport level. Nodes in the domain may also provide both types of service. A maximum limit of sixteen bandwidth clients 14 per SONET domain 10 is dictated by the SONET specification. This number does not constitute an invention limitation rather a limitation of this particular implementation of the invention.

Each time an IP service such as data, teleconference, voice, video, audio etc. needs a connection, the specific parameters of this connection have to be negotiated. A BWC 14 serving the IP service is provided with a QoS request from the IP service. The bandwidth requirements for the service and a destination address are passed to the BWC 14 along with other parameters. A route towards a destination is established according to methods well understood in the art. As IP packets enter the SONET domain 10 routing is performed at the Network Layer (OSI Layer 3) using an implementation of the Address Resolution Protocol.

The BWC 14 has a copy of a $Channel_{database}$ containing the particulars of active connections. This $Channel_{database}$ is a copy of a master $Channel_{database}$ maintained by the BWM 12 of the domain. The BWM 12 periodically broadcasts the $Channel_{database}$ to each BWC 14.

According to a preferred embodiment of the invention, decisions about bandwidth allocation/size/de-allocation in the domain are made by the BWM 12. The need for multi-level bandwidth management, and, in particular, the need for a BWM 12 in a domain, arises from a requirement to prevent simultaneous reservation of the same bandwidth by two connections. A BWM 12 in a SONET domain 10 is chosen by an election process at system start-up.

The BWM Election Process

Preferably, each node in a domain 10 is enabled to act as a BWM 12 as well as BWC 14. At system initialization, all enabled nodes in a domain 10 participate in an election process to elect a BWM 12 for the domain. In the election process, a selection index is used to determine a level of "desire to be the BWM" called the $BWM_{level}$. The $BWM_{level}$ is broadcast to every other node in the domain, and the node with the highest $BWM_{level}$ assumes the role of BWM 12 for the domain 10.

The selection index preferably employed is one in which a random number is generated and the random number is divided by sixteen. The remainder from the division is used to indicate the $BWM_{level}$. The node that has the highest $BWM_{level}$ assumes the role of BWM for the domain. In case of a tie, the process is repeated until a BWM is elected. The BWM is enabled to broadcast information about itself to the bandwidth clients in its domain and any neighboring domains. The election process is also repeated any time an acting BWM experiences a malfunction.

Establishing a Connection

To reserve bandwidth over one or more consecutive links in a path to a destination, the $Channel_{database}$ is consulted. The $Channel_{database}$ is maintained by the BWM 12 of the domain 10.

Negotiation for the reservation of bandwidth is performed by a BWC 14 on behalf of an IP service or a group of IP services. During the negotiation process, the BWC 14 sends messages to and receives messages from the BWM 12. The BWC 14 can request the establishment of a connection between a source node and a destination node by sending out a bandwidth allocation request message to the BWM 12. A management message in accordance with the invention is preferably 256 bytes long and has the following format:

Message Type: indicates the type of message, for example, BANDWIDTH ALLOCATION;

Source Address: specifies the address of the sender;

Destination Address: specifies the address of the receiver; and

Message Body: contains the contents of the message with information about the characteristics of the service.

Figure 2:
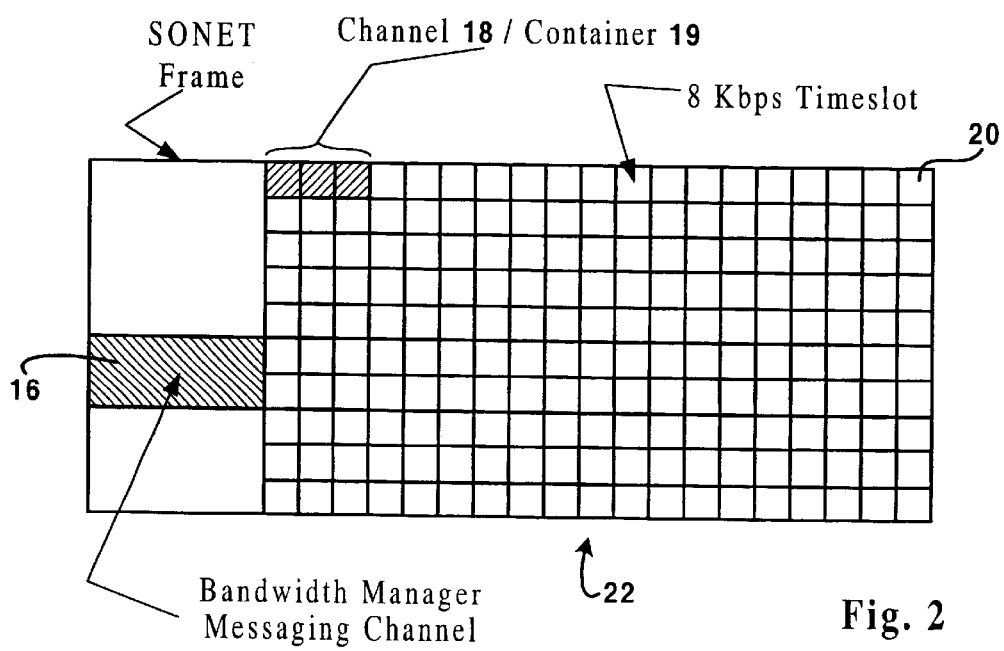
FIG. 2 is a diagram representing a SONET frame with a container and a bandwidth manager messaging channel as part of its line data communication channel.

Messages are exchanged through a bandwidth management messaging channel 16, schematically illustrated in FIG. 2. Preferably, the bandwidth management messaging channel is carried as a part of the Line Data Communication Channel (LDCC) in the Transport Overhead of the SONET frame, shown in FIG. 2. The LDCC has a total capacity of 572 Kbps, is a broadcast medium and is isolated from a SONET payload. Alternatively, the bandwidth management messaging channel 16, can be carried in a reserved portion of the SONET payload.

A proprietary protocol may be used for sending management messages. In accordance with a preferred protocol, the BWC 14 sends a management message to an adjacent upstream node. When a node receives a management message, it can perform one of the following actions:

if the message is a "bandwidth allocation" message:
if the node is not a BWM, the message is forwarded to the next node.
if the node is a BWM, it will:
terminate the message;
process the message; and
send a reply to the next node.
if the message is an acknowledge/negative-acknowledge bandwidth allocation message:
if the node is a BWM, it will terminate the message;
if the node is a BWC:
if the source or destination address for a traffic flow to which the message relates does not match an address of the BWC, it will forward the message to the next node;
if the BWC's address is either source or destination address for the traffic flow, it will then process the message and then forward the message to the next node.

This protocol enables the BWC bandwidth requests to be processed in real time.

When an IP service intends to broadcast data to different nodes in a domain 10, the bandwidth allocation request message specifies a destination address list. The acknowledge message for the bandwidth allocation request also specifies the destination address list, which alerts the intended recipients of the broadcast data of the connection setup. Successful bandwidth allocation negotiation establishes a connection between the source node and the destination node(s) in the SONET domain. The connection is guaranteed the negotiated bandwidth for data transfer between the source node and the destination node. The data transfer delay is deterministic because connections in a synchronous network, such as SONET, only require processing at the source node and the destination node. Processing time is independent of the number of intermediate nodes because data does not leave the physical layer when traversing intermediate nodes. Consequently, queuing and buffering of IP packets in intermediate nodes is eliminated.

The connection with its specified bandwidth and delay factor can be thought of as a data channel 18 between the source node and the destination node(s). Data is piped through this channel 18 at the SONET frame rate, once every 125 μs. The SONET frame is a sequence of 8 Kbps time slots. As indicated in FIG. 2, the bandwidth of the channel 18 is determined by how many time slots are allocated to the channel on a frame-by-frame basis.

Point-to-Point Channels

A point-to-point channel 18 is established between a source node and a destination node at the request of an IP service for bandwidth. The channel 18 exists between the source node and the destination node as long as there is data to be transferred between the source and destination nodes. Subsequent IP service requests for bandwidth between the source and destination are equivalent to requests for an increase in the bandwidth allocated to the channel 18 between the source and destination. Therefore two IP services sending data from the same source to the same destination share the same channel.

A point-to-point channel 18 is a full duplex connection. The source and destination nodes use the same channel to send data between each other on the optical fiber ring of the SONET domain 10. The channel 18 has elasticity in that the bandwidth (time slots per frame) allocated to it can be changed on demand through negotiation. Either the source or destination BWC 14 may negotiate for adjustment of bandwidth using the protocol described above for bandwidth allocation. The bandwidth of a channel 18 is the bandwidth successfully negotiated by the BWC 14 requiring the most bandwidth. A channel is owned by the BWC 14 that initiated the data transport request to set up the channel.

Multicast Channels

A multicast channel can be setup with one transmitter and more than one receiver. The multicast channel is also a full duplex channel. The source BWC 14 uses one channel to send data to multiple destination BWCs in the optical fiber ring of the SONET domain 10. All destination BWCs receive the same information, though they may not return any data to the source. The bandwidth (time slots per frame) allocated to a multicast channel can be changed on demand through negotiation if the source BWC 14 negotiates size-adjustment of bandwidth using the protocol described above for bandwidth allocation negotiation. The multicast channel is owned by the source BWC 14.

Default Channels

Figure 3:
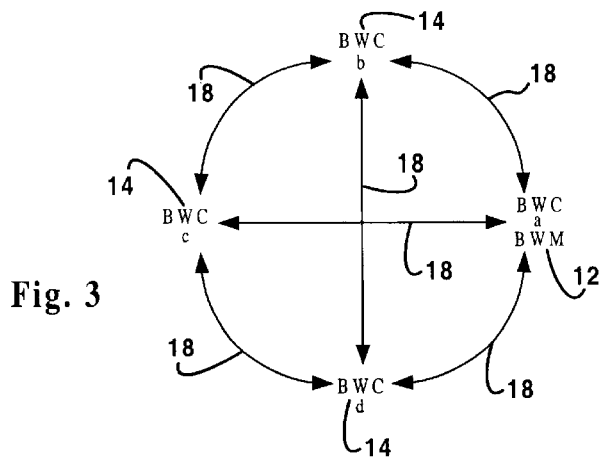
FIG. 3 is a schematic diagram graphically illustrating a set of best-effort full duplex connections that are set up between the nodes of a four-node SONET domain at start-up in accordance with the present invention.

Hosts connected to BWCs 14 communicate with others via channels 18. At system initialization, the BWM 12 allocates a predetermined number of small, fixed-size channels to be used for carrying "best-effort" traffic and minimizing the impact of channel setup time. These channels are called "default channels." The size of a default channel is determined by a variable, called $CS_{default}$. The total number of full duplex default channels is computed using the following formula:

$$NumberofChannels = \frac{N*(N-1)}{2}$$

where N is the number of BWC nodes 14 configured in the SONET domain 10. FIG. 3 schematically illustrates the allocated full duplex channels default channels in a 4-node SONET ring.

Containers

In a SONET frame, a channel is represented by a container 19. The container 19 consists of one or more time slots 26 in a SONET frame 22. A container 19 is schematically illustrated in FIG. 2. The container 19 has a size defined by a $TS_{size}$ variable which specifies the number of time slots 20 belonging to the container 19. The $TS_{size}$ is determined at connection setup time to correspond to the bandwidth initially requested by the IP service. The size varies according to variations in data traffic volume. The data capacity of a container 19 may range from about 8 Kbps to about 49.5 Mbps, depending on the size of a time slot 20 which can itself be variable.

Figure 4:
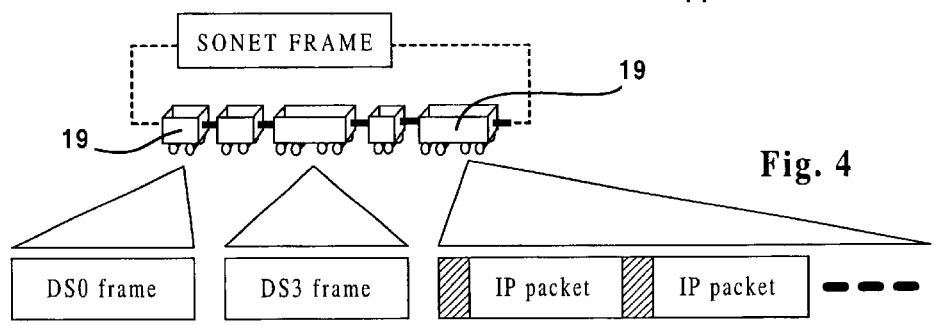
FIG. 4 is a visual representation of data and voice transport in accordance with the invention, schematically illustrated as a train of containers.

As illustrated in FIG. 4, the SONET link may be thought of as a train of many containers. Bandwidth allocated to streams of constant volume such as voice data traffic is also transferred using containers. For voice data traffic, the BWM 12 simply allocates one fixed-size container 18 that is large enough to accommodate the voice grade traffic connections.

Container Fragmentation

A container 19 is not necessarily made up of contiguous time slots 20. Even if a container 19 initially consists of contiguous time slots 20, container fragmentation may occur when connections are up for a long period of time. This is especially likely if the connection has a variable traffic volume coupled with a large number of other connection set-ups and releases. Another instance in which container fragmentation may occur is at connection setup. It may be that at set-up contiguous time slots are simply not available to accommodate the full bandwidth required by a new connection for an IP service, even though there is enough bandwidth scattered over non-sequential time slots in a frame to accommodate the connection.

Container fragmentation only contributes to more processing in order to locate the dispersed time slots 20. To compensate for processing time loss, a linked list is used to manage the time slots 20 that make up a container 18. The linked list (not shown) specifies the location of time slots 20 in a SONET frame 22 that belong to a given container 19. The linked list permits a container to consist of any combination of contiguous or non-contiguous time slots 20. The size of a time slot 20 controls a trade-off between processing time spent to reconstitute IP packets and efficient data throughput.

In addition, a defragmentation process runs regularly to defragment the allocated time slots 20 to optimize the look-up process using the linked list.

Dynamic Bandwidth Adjustment

Figure 5:
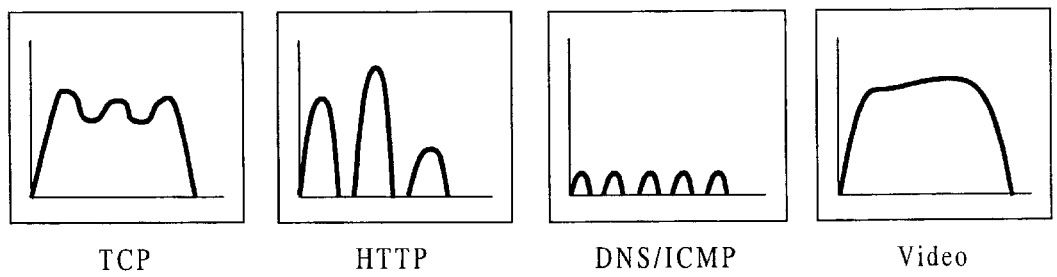
FIG. 5 shows examples of the variation of data traffic volume over time for different IP services.

IP traffic patterns are difficult to predict. As shown in FIG. 5, different IP protocols generate different types and rates of data flow. Besides, IP traffic flow at the edge of the network is different from traffic flow in the SONET domain 10. Protocol identification and historical traffic patterns are therefore used in a container size allocation algorithm to achieve efficient bandwidth utilization.

The preferred mechanism for implementing channel elasticity is the adjustment of the size of containers 19. The size of a container 19 is preferably adapted to variations in the volume of traffic between a sender and the receiver. Dynamic bandwidth allocation is a real time adjustment of the size of containers 19. The size of a container is adjusted by the BWC 14 on behalf of the IP services using the channel. Each BWC 14 at the ends of the channel negotiates an adjustment of the size of the container based on the amount of IP traffic it multiplexes into the SONET frame. The negotiation is done through management messages sent between the BWC 14 and the BWM 12 in a manner similar to the one described above with reference to bandwidth allocation.

It is the function of the BWC 14 to continuously monitor the volume of data traffic to conform to service traffic patterns. At regular traffic intervals ($t_{update}$), the BWC 14 receives a data traffic update from a Driver entity 24 (FIG. 8) which is described below. The BWC 14 uses this information to determine when to allocate or de-allocate containers 19, as well as when to resize containers and how much to increase or decrease their size. The following describes the algorithm that is used by the BWC 14 for this purpose:

every $t_{update}$ seconds, the data throughput for each active channel at the node is updated by the driver entity. This information is preferably represented in terms of bytes per $t_{update}$ seconds.

for every second, there are $A_{max}$ updates, where $A_{max}$ is calculated as follows:

$$A_{max} = \frac{1}{t_{update}},$$

the rate of change in traffic volume for a given channel is calculated by the following formula:

$$m_i = \frac{traff_i - traff_{i-1}}{t_{update}},$$

where "m" is the rate of change or slope and "i" is an update indexing integer ranging from 1 to $A_{max}$. When the value of "i" reaches its maximum value, it is reset to 1.

the projected required bandwidth to accommodate the traffic volume is then calculated based on the following formula:

$$b_{proj} = m_i * A_{max},$$

if the projected value $b_{proj}$ is between 20% and 80% of the current container's size, no action is taken;

if the value of $b_{proj}$ is greater than or equal to 80% of the current container's size, then the BWC 14 will request the BWM to increase the size of the container by one time slot 20. If the request is granted, the BWC 14 will update the driver entity 24 with the new container's size;

if the value of the $b_{proj}$ is smaller or equal to 20% of the container's size, then the BWC 14 will request the BWM 12 to decrease the size of the container by one time slot 20. If the request is granted, then the BWC 14 will inform the driver entity 24 about the change.

Connection Termination

Channels 18 are reserved by their owners until they are released. Negotiation is not required to release a connection. Rather, the BWM 12 is informed of the connection termination by the owner of the channel. A message of type BANDWIDTH DE-ALLOCATION is sent to the BWM 12 informing nodes involved in the connection that the BWC 14 has instructed that the channel be released. This message can only be acknowledged.

Bandwidth Manager

Figure 6:
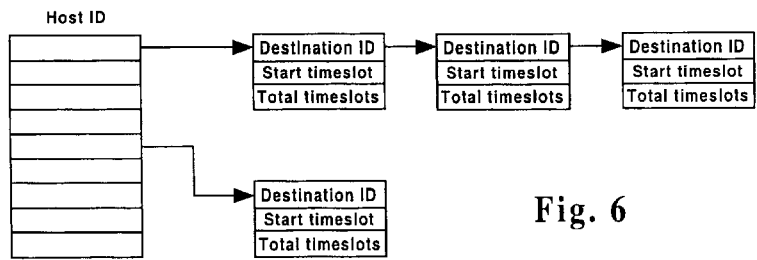
FIG. 6 is a diagram showing the structure of a channel database and the relationship between the database and records in the database as well as the relationship between individual records.

One of the functions of the BWM 12 is to track the usage of channels 18 within a SONET domain 10. The BWM 12 maintains the $Channel_{database}$. Records in the database are schematically shown in FIG. 6 and have the following attributes:

1. Each Network Interface Card (NIC) at a node has a unique data link layer address which serves as the Host ID. The Host ID is used as the key attribute for records in the database. The Host ID also represents one end of a channel, the sender.
2. Sender List: Each element of the linked list identifies one receiver using the data link layer address of the receiver NIC. Each element of this linked list contains the following information:
   a. a Destination ID which identifies the address of the receiver of the data carried on the channel, as described above;
   b. a Start Time Slot which indicates the starting time slot 20 of a container 19 corresponding to the channel. This number specifies the time slot with respect to the Synchronous Payload Envelope of the SONET frame; and
   c. a Total Number of time slots 20 which is the $TS_{size}$ variable defining the total number of time slots 20 in the container 19 beginning from the time slot 20 identified by the variable of Start Time Slot attribute.

The BWM 12 can process requests from the BWC's 14 in real time. The procedure for processing a request proceeds as follows:

1. The source address, extracted from the message sent by the BWC 14, is used as the host ID index to search the $Channel_{database}$.
2. If there is a record in the $Channel_{database}$ that corresponds to the host ID and the Destination ID respectively extracted from the source address and the destination address of the BWC request, the BWM 12 performs the following actions:
   a. if the received message is a bandwidth allocation message:
      i. the BWM 12 attempts to allocate more bandwidth to the channel identified in the $Channel_{database}$;
      ii. the BWM 12 sends an acknowledge message if the allocation is successful and a not-acknowledge message if it is not;
      iii. the BWM 12 updates the $Channel_{database}$ accordingly;
   b. if the received message is a bandwidth de-allocation message:
      i. the BWM updates the $Channel_{database}$ accordingly; and
      ii. sends an acknowledge message.
3. Else if there is no record in the $Channel_{database}$ associated with the source address, then the BWM 12 performs the following actions:
   a. if the message is a bandwidth allocation message:
      i. if there is inadequate available bandwidth to create a channel, then the BWC 14 is instructed to use a default channel to transfer data traffic for the new service, if a default channel is available. This means that QoS cannot be guaranteed because default channels are not elastic so a best-effort type of service is offered instead;
      ii. else, a new record is created in the $Channel_{database}$ and bandwidth is allocated to a new channel with the default size $CS_{default}$, or $TS_{size}$ if bandwidth is available and an acknowledge message is sent by the BWM 12.

From the point of view of the BWC 14, the default channel is a channel like all others. When a BWC 14 requests new or additional bandwidth and the required bandwidth is not available the BWC 14 is instructed to use the default channel. Meanwhile, the BWM 12 continues to search for available bandwidth and when bandwidth becomes available the BWM 12 (having recorded BWC requests) processes outstanding or incomplete bandwidth requests by messaging the BWC respecting the additional channel (timeslots) that should be used. If the BWC does not need the additional bandwidth at that time, the BWC will send a de-allocation message to BWM.

Inter-Domain Data Transport

The BWM 12 is responsible only for data transferred to or from nodes within its domain. It communicates with the BWMs of adjacent domains only when there is data traffic traversing the domain's boundary. For data traffic which originates in one SONET domain 10 and terminates on another, it is the responsibility of the BWM 12 in the originating domain, to communicate messages to the other BWM(s) to allocate/de-allocate containers 18, as required. FIG. 7 illustrates interconnected domains A, B and C. The BWM 12 of domain A is BWC f, the BWM for domain B is BWC i and the BWM of domain C is BWC k. The BWMs of different domains communicate with one another using the protocol used by a BWC 14 to communicate with a BWM 12 in its own domain. The management messages received from adjacent domains appear to a local BWM 12 as originating from the local BWC 14, which corresponds to the node serving as a gateway to the adjacent domain. Consequently, the number of messages exchanged by the BWM 12 and BWC 14 nodes are independent of the number of domains in a network.

A total of two messages (one request and one reply) are generated by the BWC 14 node and the BWM 12 for every container's allocation/size adjustment/de-allocation. These two messages are used regardless of the number of nodes in a domain or the number of domains in a network.

Scalability

Scalability can be accomplished in several ways. If the new traffic demand is between say 2 or 3 clients then an overlay domain can be constructed using new fiber and new NIC cards, as described below. Another way is to upgrade the capacity of the ring by upgrading the all BWC NIC cards to a higher rate (e.g. OC-3 to OC-12). No new fiber is required.

When data traffic volume within a domain exceeds ring capacity, a secondary ring can be constructed. The construction only requires installation of additional SONET NICs and fibers. The node and software remain the same. Typically, four NICs can be installed at each SONET node. Alternatively, if data traffic volume between two nodes exceeds capacity of a link between those nodes, the capacity of that link can be increased by adding a new fiber to that particular link and extra SONET NICs at the nodes in that link, as required. The nodes and software otherwise remain the same. FIG. 7 also illustrates two separate domains A and C which have been scaled up by adding extra fiber 26. The link between BWC f and BWC g in domain A has an extra fiber 26 which provides increased data transfer capacity in the link. The data transfer capacity is increased in domain C by the addition of a second ring 28.

Robustness

Figure 8:
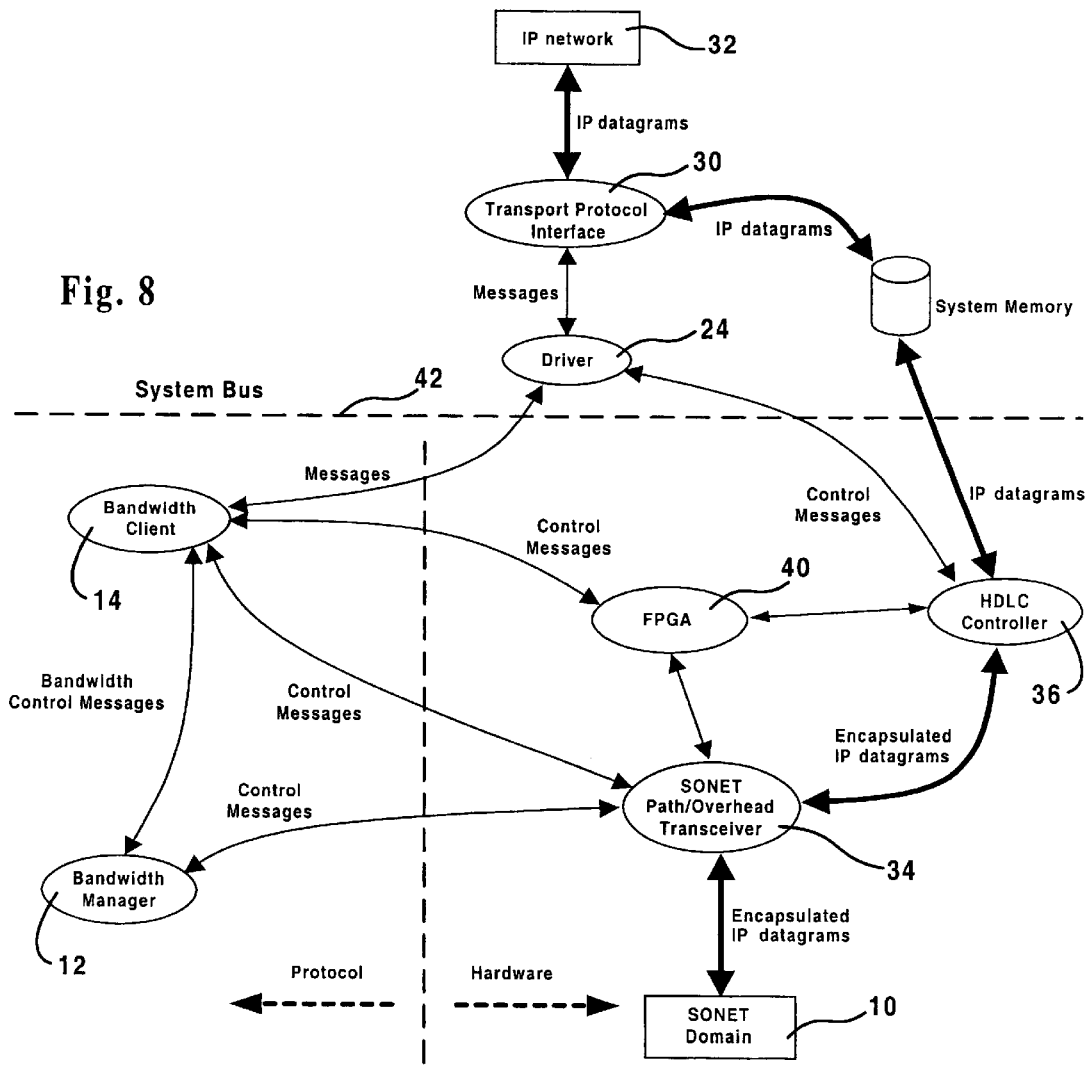
FIG. 8 is a diagram of a node showing the functional components of a node and the information exchanged between those components as well as information exchanged with the bandwidth of the manager of the domain.

Although the figures which illustrate the invention indicate a unidirectional single fiber ring, it should be understood that ring protection may be provided to ensure network robustness. Ring protection may be provided in many ways 1:1, 1+1, 1:n, unidirectional line switched ring (ULSR-2 fiber) or bi-directional line switched ring (BLSR-4 fiber). These robustness solutions are well understood in the art and will not be further explained Physical Implementation FIG. 8 is a functional block diagram of a node in accordance with the invention. As shown, the node has a least two network interfaces; a Transport Protocol Interface (TPI) 30 is used to communicate with an IP network 32. Data exchanged through the TPI 30 uses a format specified by the IEEE 802.3 standard. A SONET Path/Overhead Transceiver (SPOT) 34 is used to communicate with the SONET domain 10. Data exchanged through the SPOT 34 uses a format specified by Bellcore GR-253, Issue 2.

When IP packets enter a SONET domain at an edge node from the IP network side, they are first processed by the TPI 30. The TPI 30 supports the standard routing protocols that are specified by:

RFC 768—User Datagram Protocol (UDP);
RFC 791—Internet Protocol (IP);
RFC 792—Internet Control Message Protocol (ICMP);
RFC 793—Transmission Control Protocol (TCP);
RFC 826—Address Resolution Protocol (ARP).

The IP packets are subsequently forwarded to the software Driver entity 24.

One function of the Driver 24 is to provide the BWC 14 with current information about the IP traffic at the node. The Driver 24 is the component that provides the information about the IP traffic used in the process of Dynamic Bandwidth Size Adjustment described above.

The Driver 24 is also responsible for logically routing the IP packets to the correct node of the SONET domain 10. If a route does not exist, which happens when a channel for delivering the IP packets to their destination node does not exist, the Driver 24 signals the BWC 14 to set up a channel as described above.

When data traffic arrives from the IP network 32, the Driver 24 tries to match the destination address of the IP packet with one of the records in the destination linked list of the Channel$_{database}$ distributed to the node by the BWM 12. If there is a match, the Driver 24 instructs a High Level Data Link Controller (HDLC) 36 to place the IP packets into the container 19 corresponding to the channel 18 identified in the record. If there is no match, as in the case of best-effort traffic, the Driver 24 instructs the HDLC 36 to use a default channel 18. For data traffic destined to the IP network interface, the Driver 24 simply passes the IP packets to the TPI 30. Since the edge node uses IP addresses to route the IP packets to the destination node, this process is known as "routing", which is equivalent to the "OSI layer 3".

High Level Data Link Controller

The main function of the HDLC 36 is to provide the minimum level of framing for IP datagrams in the synchronous SONET links. In transmitting datagrams through the SONET domain 10, and before the IP datagrams are sent out to the SPOT 34, the HDLC 36 encapsulates the IP datagrams with a header and a footer having a "01111110" bit pattern. To distinguish the headers and footers from the data in an IP datagram, the HDLC 36 performs a bit-stuffing algorithm. The bit-stuffing algorithm inserts a "0" bit after every five contiguous "1" bits. In doing this, the HDLC 36 ensures the data pattern inside a transmitted IP datagram does not contain more than five consecutive "1" bits so that an IP datagram data sequence is not confused with the header or footer. The headers and footers are used by the HDLC 36 at the receiving node to determine a starting and ending byte of an IP datagram inside a container. At the destination node, an IP datagram is bit de-stuffed to discard all "0" bits that directly follow five contiguous "1" bits, and the restored IP datagram is passed to the TPI 30.

The HDLC 36 is also responsible for moving the IP datagram in and out of the containers. This operation is called packet switching and it takes place at OSI Layer 2. The IP datagrams are presented to the SPOT 34 in the form of a bit stream that is multiplexed into the SONET link. For data traffic inside the domain, no further switching or routing is required.

Figure 9:
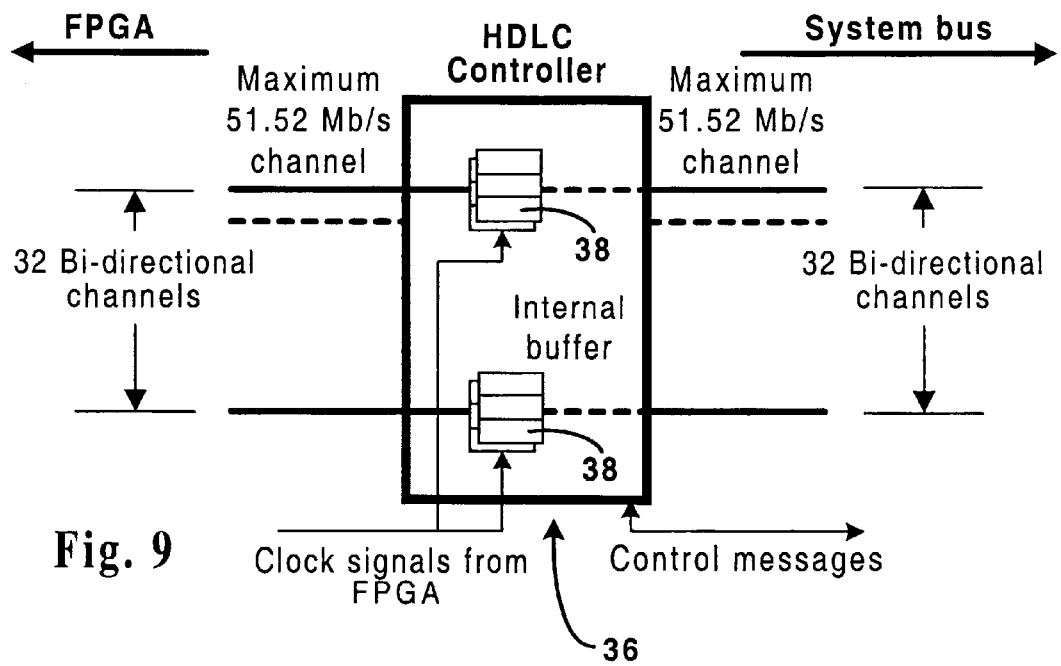
FIG. 9 is a schematic diagram of a High level Data Link Controller (HDLC)

A single HDLC 36 can map a maximum of 32 individual channels inside the SONET payload, as shown in FIG. 9. A channel can have a maximum bandwidth of 51.52 Mbps, which is the maximum bandwidth that a single HDLC 36 can handle. For a node that offers OC-3 rate (i.e. 155 Mbps), three such HDLCs 36 are used to service the link.

Each full duplex channel has two circular buffers 38 at the source and the destination nodes, one for transmission and one for reception. They are used as processing storage. Outgoing IP packets and incoming data streams are placed in these buffers 38 before the HDLC controller 36 can perform the bit stuffing/de-stuffing process. The rate at which the data leaves the buffers is controlled by clock signals provided by a Field Programmable Gate Array (FPGA).

The HDLC 36 can interrupt the node through the system bus 42 when one of the transmit/receive buffers is under-run (i.e. there is no data in the buffer when data is expected) or overflow (i.e. there is no more room in buffer to store incoming data).

Field Programmable Gate Array

Figure 10:
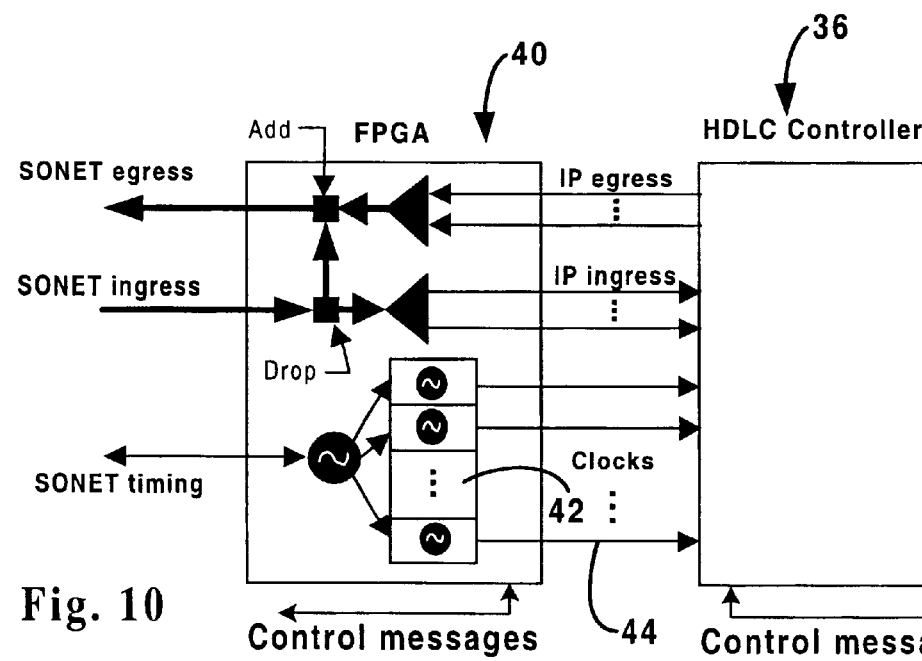
FIG. 10 is a schematic diagram of a Field Programmable Gate Array (FPGA) used to effect the Add/Drop function and extract timing information from a SONET frame.

The main functions of the FPGA 40 are to act as a timing source for all line side outgoing and incoming traffic by providing timing signals to the HDLC controller 36, and to perform an Add/Drop function. The BWC 14 instructs the FPGA 40 to set up the correct timing information for the HDLC 36 and the SPOT 34. FIG. 10 shows an FPGA 40 and its relation to the HDLC 36.

When the node is configured to receive data on a particular channel (i.e. a container 19, consisting of a combination of one or more time slots 20), the FPGA 40 is responsible for extracting the data from that container. This refers to the drop function. A stream of dropped data is passed on to the HDLC 36. The data in that channel is then moved to the Add function where it is either replaced by outgoing data or left intact, depending on whether the node is configured to transmit on that channel and whether there is any data to be sent. When a node is configured to transmit on a particular channel, which may be the same channel that it is receiving on, the FPGA 40 replaces any data on that channel with the incoming data stream from the HDLC 36 in the Add function. If a particular channel is not configured as a transmit/receive channel, any data the channel is passed through without modification.

Besides performing the Add/Drop function, the FPGA 40 also uses the timing signals from—the SPOT 34 to drive a group of thirty-two internal clocks 42. Each of these internal clocks 42 can be associated with a channel serviced by the HDLC 36. When a channel is configured to operate in a certain bandwidth, the associated internal clock 4 operates only during periods that time slots allocated to the channel are transmitted.

Inter-Domain Data Traffic

FIG. 11 illustrates two domains D and E which share a BWC n. When data is routed between the domains D and E, it remains at the OSI Physical Layer 1 because once a route to the destination has been established and the data is multiplexed into the SONET link, the data remains in the physical layer until it reaches the destination regardless of whether it crosses domains.

FIG. 12 illustrates how a node that serves two domains performs this function. Data is retrieved from a specified container from the incoming optical signal of one domain and converted to the equivalent electrical signal. The electrical signal is passed through the FPGA 40 to the HDLC 36 on the incoming side (bit de-stuffing is not performed). The HDLC 36 passes the electrical signal through the back plane to the HDLC 36 of the other domain (bit stuffing is not required). The HDLC 36 inserts the data into an appropriate container of the second domain, passes the electrical signal to the FPGA 40, and the SPOT 34 converts the electrical signal back to an optical signal. This entire process is "layer 2 switching" and no data is buffered.

The invention thereby provides a reliable transport for IP data traffic which ensures guaranteed QoS. Bandwidth in the SONET domain is efficiently utilized through the use of elastic containers for data transport.

Changes and modifications to the preferred embodiments described above will no doubt become apparent to those skilled in the art. The scope of the invention is therefore intended to be limited solely by the scope of the appended claims.

We claim:

1. A method of transporting Internet Protocol (IP) datagrams received from an IP network through a synchronous network with a quality of service characterized by a deterministic end-to-end transfer delay in the synchronous network, comprising the steps of:

accepting at a node, which is a bandwidth client (BWC) in the synchronous network, a connection request from an IP service seeking to transfer datagrams through the synchronous network;

formulating a management message at the BWC to request a bandwidth allocation in response to the connection request;

sending the management message to a bandwidth allocation manager, which is also a BWC in the synchronous network; and assigning the connection to a channel for transporting the datagrams if the bandwidth allocation manager grants an allocation of the bandwidth for the connection request.

2. The method as claimed in claim 1 further comprising the steps of:

monitoring the volume of IP datagrams received at the node in the synchronous network and periodically computing a utilization of the capacity of the channel to determine whether the capacity of the channel should be adjusted by an increase or decrease in channel capacity; and sending a management message to the bandwidth manager in an instance where the channel capacity should be adjusted to request approval by the bandwidth manager for a change in the channel capacity.

3. The method as claimed in claim 2 wherein computing a utilization of the capacity of the channel comprises the steps of:

computing $A_{max}$ updates in each consecutive predetermined unit of time ($t_{update}$) to determine the utilization of the capacity by calculating a rate of change in traffic volume for a given channel using the formula:

$$m_i = \frac{traff_i - traff_{i-1}}{t_{update}},$$

where m is a rate of change or slope and i is an update indexing integer ranging from 1 to $A_{max}$;

computing a projected bandwidth ($b_{proj}$) required to accommodate the traffic volume using the formula:

$$b_{proj} = m_i * A_{max},$$

if the projected bandwidth is less than a first predetermined percentage or greater than a second predetermined percentage of the capacity of the channel, sending a management message to the bandwidth manager to request a decrease or an increase in the channel capacity.

4. The method as claimed in claim 1 wherein a channel is used for transporting the IP datagrams of a plurality of connections, each of the connections being served by the same source and destination nodes in the synchronous network.

5. The method as claimed in claim 1 wherein the connection is a full duplex channel between the two nodes in the synchronous network.

6. The method as claimed in claim 1 wherein the bandwidth manager maintains a database used to track the status of channels in use in a domain for which the bandwidth manager is responsible for bandwidth allocation.

7. The method as claimed in claim 1 wherein each channel comprises one or more time slots in a synchronous frame forming a corresponding container, and is defined by a record which stores a starting time slot, a number of time slots in the container, and an identity of each of the time slots.

8. The method as claimed in claim 7 wherein the time slots comprise contiguous and non-contiguous time slots within the synchronous frame.

9. The method as claimed in claim 8 wherein a process runs periodically to defragment the time slots in the synchronous frame to ensure that the time slots in each container are contiguous.

10. The method as claimed in claim 1 wherein the synchronous network is organized in a plurality of domains, each domain having one bandwidth manager and the bandwidth manager is responsible only for containers transferred to or from nodes within its domain.

11. The method as claimed in claim 10 wherein if traffic originates in one domain and terminates in another, it is the responsibility of the bandwidth manager in the domain in which the traffic originates to communicate management messages to a bandwidth manager in an adjacent domain to allocate, release or size containers in the adjacent domain as required.

12. The method as claimed in claim 1 wherein each node in the synchronous network has a capacity to serve as the bandwidth manager, and a bandwidth manager is elected by the nodes using an automatically generated index, each non-elected node acting as a bandwidth client under control of the bandwidth manager.

13. The method as claimed in claim 12 wherein the automatically generated index comprises a number derived by dividing a randomly generated number by a predetermined divisor.

14. The method as claimed in claim 1 further comprising the step of:
creating a predefined number of default channels for transporting traffic that does not require a guaranteed quality of service.

15. The method as claimed in claim 14 wherein bandwidth is used in the default channels, if available, during connection setup to transfer datagrams received before the bandwidth manager has allocated bandwidth in a channel for the connection.

16. The method as claimed in claim 14 wherein bandwidth is used in the default channels, if available, to transfer datagrams when insufficient bandwidth is available for a connection, if the source of the datagrams accepts service without a guaranteed quality of service.

17. The method as claimed in claim 16 wherein bandwidth requests that cannot be granted by a bandwidth manager are tracked and bandwidth is granted to a bandwidth client making a request when the bandwidth becomes available for the connection.

18. The method as claimed in claim 17 wherein the bandwidth client sends a de-allocation request to the bandwidth manager if the bandwidth granted for the connection is no longer required by the time that the bandwidth becomes available for the connection.

19. The method as claimed in claim 14 wherein the number of default channels created is computed using a formula:

$$NumberofChannels = \frac{N*(N-1)}{2}$$

where N is the number of nodes in a synchronous domain.

20. Apparatus for transporting Internet Protocol (IP) datagrams received from an IP network through a SONET network with a quality of service characterized by a deterministic end-to-end transfer delay in the SONET network, comprising:
a plurality of SONET nodes interconnected by at least one optical fiber ring, each of the SONET nodes including a Transport Protocol Interface (TPI) for receiving the IP datagrams from the IP network, a driver entity for passing the IP datagrams to a High Level Data Link Controller (HDLC) which provides a minimum level of framing for IP datagrams, a Field Programmable Gate Array (FPGA) for generating timing signals for the HDLC and for performing an Add/Drop function to insert datagrams into and extract datagrams from SONET frames; and
a one of the SONET nodes being further adapted to serve as a bandwidth manager to track usage of containers for transporting the datagrams within the SONET network.

21. The apparatus as claimed in claim 20 wherein the driver entity provides a SONET node with which it is associated with current information about IP traffic volume at the SONET node.

22. The apparatus as claimed in claim 21 wherein the driver entity is also responsible for logically routing the IP datagrams to a correct receiver node in the SONET network.

23. The apparatus as claimed in claim 22 wherein the driver entity instructs the SONET node with which it is associated to create a channel for use in transporting the IP datagrams if a channel for the datagrams does not exist.

24. The apparatus as claimed in claim 20 wherein the HDLC encapsulates the IP datagrams with a header and a footer prior to passing the datagrams to the FPGA for insertion into containers.

25. The apparatus as claimed in claim 24 wherein the HDLC bit stuffs the IP datagrams prior to encapsulating the IP datagrams with the header and the footer, the bit stuffing being performed to ensure that data in the IP datagrams is not mistaken for the header or the footer.

26. The apparatus as claimed in claim 20 wherein the FPGA uses timing signals from an incoming SONET stream to drive a group of clocks for providing the timing signals to the HDLC.

27. The apparatus as claimed in claim 20 wherein the bandwidth manager maintains a database to track usage of channels used to transport the IP datagrams, the database storing a source address, a destination address, a starting time slot for the container in a SONET frame, a number of time slots in the container and a location of each time slot in the SONET frame.

28. The apparatus as claimed in claim 27 wherein the nodes in the SONET network are clients to the bandwidth manager and the clients are adapted to communicate with the bandwidth manager using a protocol under which a client requests bandwidth allocation when a new connection is set up in the SONET network, and the bandwidth manager approves or disapproves the request based on bandwidth availability in the SONET network.

29. The apparatus as claimed in claim 20 wherein each SONET node is adapted to serve as the bandwidth manager and the node that serves as the bandwidth manager is determined by an election process in which each of the SONET nodes participates.

30. The apparatus as claimed in claim 29 wherein during the election process, each of the SONET nodes generates a random number and divides the random number by a predetermined integer that yields an election index, the node being elected to be the bandwidth manager being the node with the highest election index.

* * * * *